(12) United States Patent
Bhat et al.

(10) Patent No.: US 10,735,313 B2
(45) Date of Patent: Aug. 4, 2020

(54) REDUCING TRAFFIC LOSS DURING NETWORK DEVICE FAILURE IN AN OPEN SHORTEST PATH FIRST (OSPF) PROTOCOL-BASED LOCAL AREA NETWORK

(71) Applicant: Juniper Networks, Inc., Sunnyvale, CA (US)

(72) Inventors: Bharath RadhaKrishna Bhat, Bangalore (IN); Rajesh Shetty Manur, Bangalore (IN); Abhishek Chakraborty, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 12 days.

(21) Appl. No.: 16/167,184

(22) Filed: Oct. 22, 2018

(65) Prior Publication Data
US 2020/0127918 A1    Apr. 23, 2020

(51) Int. Cl.
| H04L 12/28 | (2006.01) |
| H04L 12/703 | (2013.01) |
| H04L 12/751 | (2013.01) |
| H04L 12/707 | (2013.01) |
| H04L 12/24 | (2006.01) |
| H04L 12/727 | (2013.01) |
| H04J 1/16 | (2006.01) |

(52) U.S. Cl.
CPC .......... *H04L 45/28* (2013.01); *H04L 41/0668* (2013.01); *H04L 45/026* (2013.01); *H04L 45/121* (2013.01); *H04L 45/22* (2013.01)

(58) Field of Classification Search
CPC .......... H04L 45/02; H04L 45/28; H04W 84/12
USPC .......................... 370/241, 389, 386
See application file for complete search history.

(56) References Cited

U.S. PATENT DOCUMENTS

| 2009/0046579 A1* | 2/2009 | Lu ..................... H04L 45/02 370/225 |
| 2014/0086043 A1 | 3/2014 | Banerjee et al. |
| 2017/0078439 A1* | 3/2017 | Hockett ............. H04L 67/322 |

(Continued)

OTHER PUBLICATIONS

Extended European Search Report for Application No. EP19165776.6, dated Sep. 27, 2019, 9 pages.

(Continued)

*Primary Examiner* — John Pezzlo
(74) *Attorney, Agent, or Firm* — Harrity & Harrity, LLP

(57) ABSTRACT

A first network device detects a link down event associated with a second network device, where the link down event is detected by the first network device prior to being detected by a third network device, and the second network device is a designated network device of a network. The first network device starts a delay timer before processing the link down event, and detects an event that includes at least one of receipt, from the third network device, of a link state advertisement message based on the link down event, or an expiration of the delay timer. The first network device determines the first network device to be a new designated network device for the network based on detecting the event, and provides, to the third network device, information indicating that the first network device is the new designated network device for the network.

20 Claims, 12 Drawing Sheets

(56) References Cited

U.S. PATENT DOCUMENTS

2018/0302321 A1* 10/2018 Manthiramoorthy ........................ H04L 12/4633

OTHER PUBLICATIONS

Request for Comments (RFC) 2328, J. Moy, Ascend Communications, Inc., "OSPF Version 2" Apr. 1998, 244 pages.

* cited by examiner

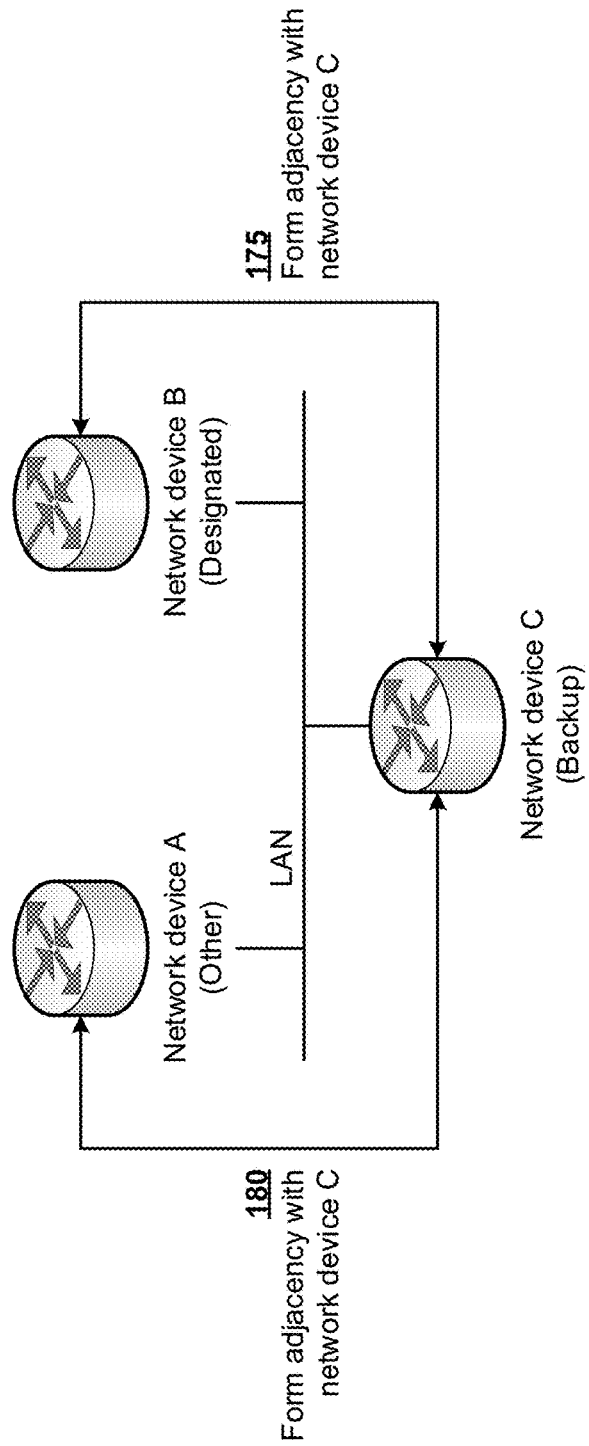

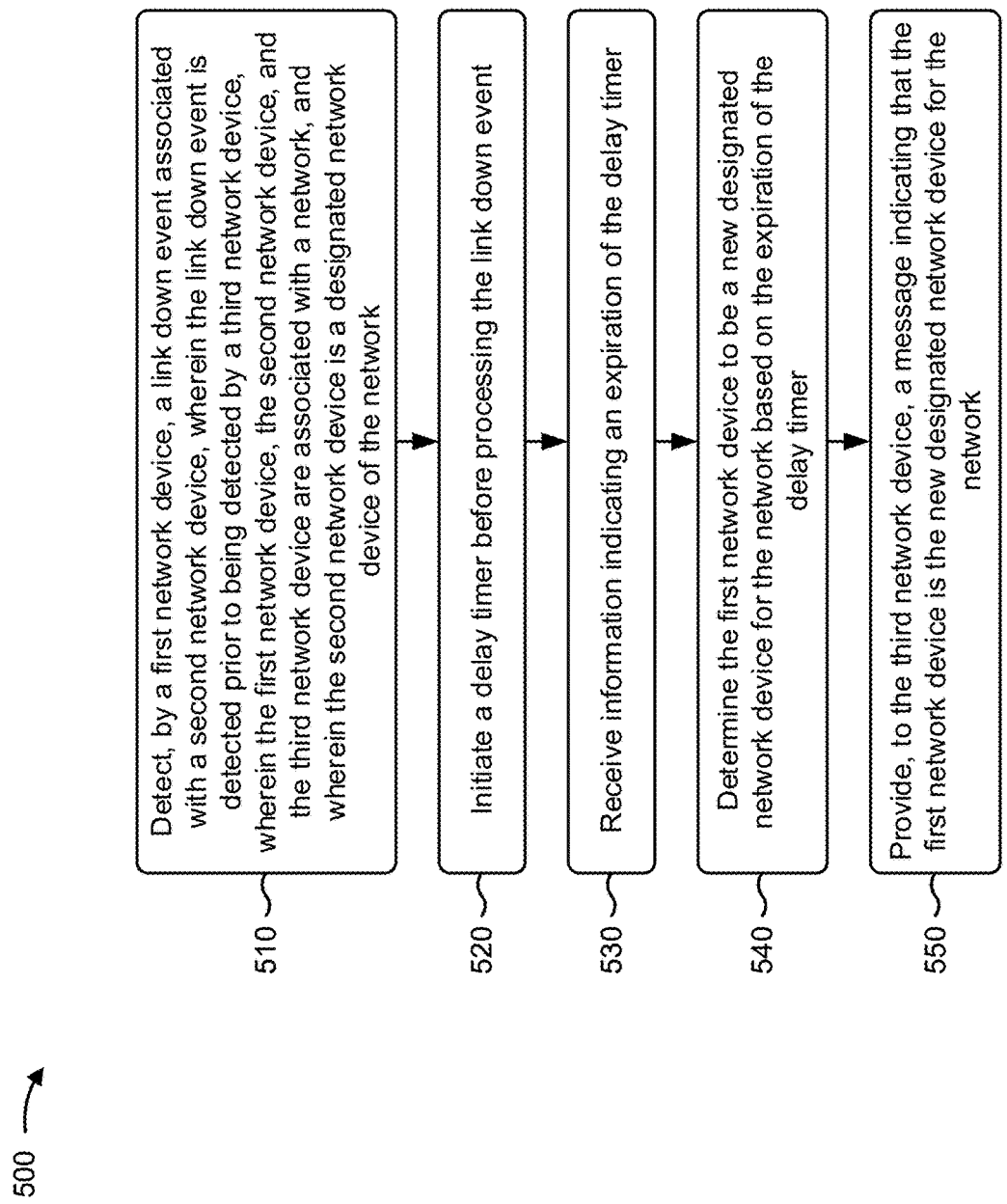

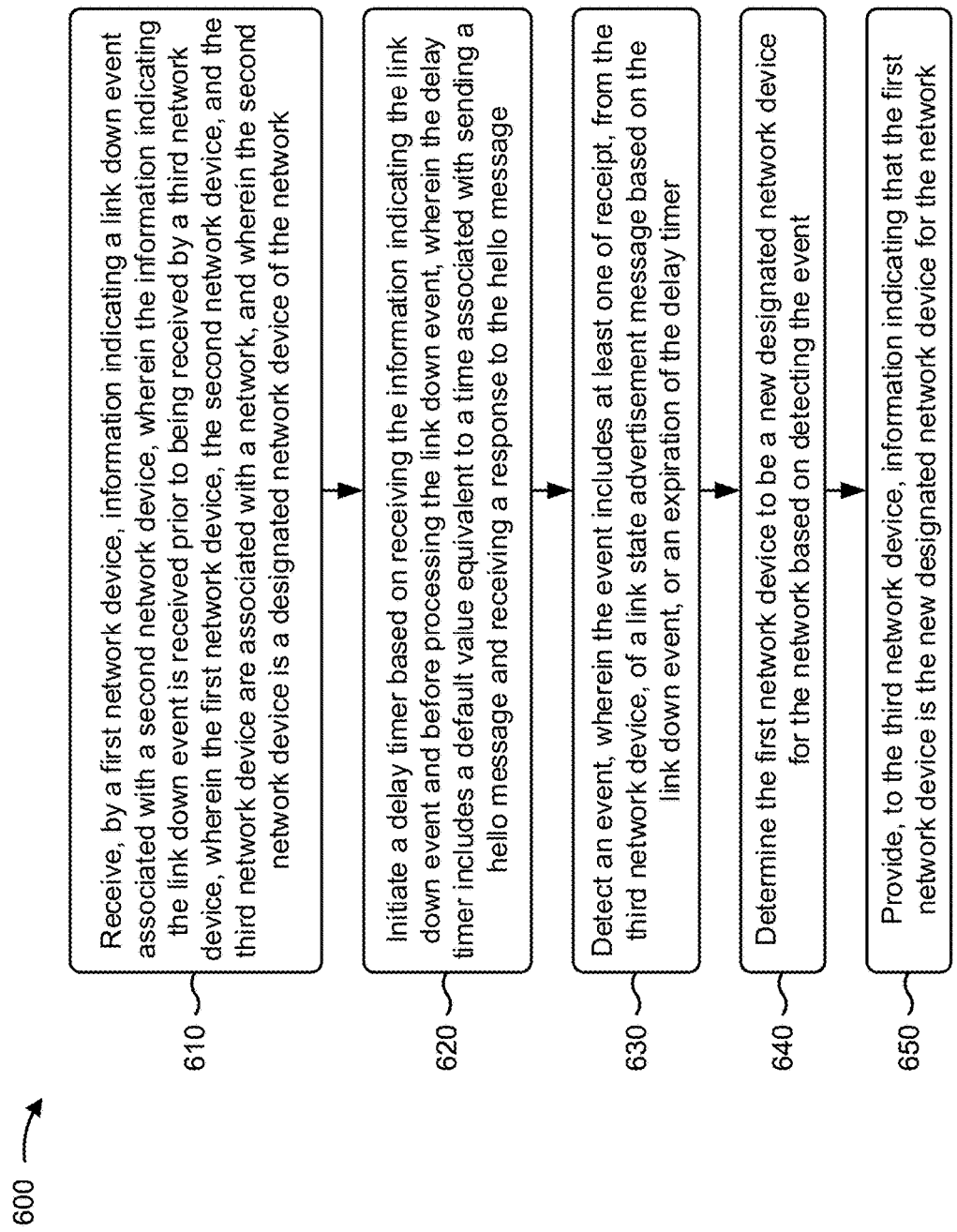

US 10,735,313 B2

REDUCING TRAFFIC LOSS DURING NETWORK DEVICE FAILURE IN AN OPEN SHORTEST PATH FIRST (OSPF) PROTOCOL-BASED LOCAL AREA NETWORK

BACKGROUND

Broadcast local area network (LAN) topologies are commonly used with the open shortest path first (OSPF) protocol. The OSPF protocol defines a designated network device (e.g., a designated router or DR) and a backup designated network device (e.g., a backup designated router or BDR) for a broadcast network to optimize flooding and to avoid having full mesh connections. Both the designated network device and the backup designated network device have adjacencies (e.g., share full state information of a link state database or LSDB) with all other network devices on the LAN. When the designated network device goes down or a link connecting the designated network device goes down, the backup designated network device assumes the responsibility of the designated network device and is elected as the designated network device. This may ensure that the transition of the backup designated network device to the designated network device occurs in a minimum quantity of time so that adjacencies will not have to be rebuilt with the new designated network device.

SUMMARY

According to some implementations, a method may include detecting, by a first network device, a link down event associated with a second network device, where the link down event may be detected by the first network device prior to being detected by a third network device, where the first network device, the second network device, and the third network device may be associated with a network, and where the second network device may be a designated network device of the network. The method may include starting, by the first network device, a delay timer before processing the link down event, and detecting, by the first network device, an event that includes at least one of receipt, from the third network device, of a link state advertisement message based on the link down event, or an expiration of the delay timer. The method may include determining, by the first network device, the first network device to be a new designated network device for the network based on detecting the event, and providing, by the first network device and to the third network device, information indicating that the first network device is the new designated network device for the network.

According to some implementations, a first network device may include one or more memories, and one or more processors to detect a link down event associated with a second network device, where the link down event may be detected prior to being detected by a third network device, where the first network device, the second network device, and the third network device may be associated with a network, and where the second network device may be a designated network device of the network. The one or more processors may initiate a delay timer before processing the link down event, and may receive information indicating an expiration of the delay timer. The one or more processors may determine the first network device to be a new designated network device for the network based on the expiration of the delay timer, and may provide, to the third network device, a message indicating that the first network device is the new designated network device for the network.

According to some implementations, a non-transitory computer-readable medium may store instructions that include one or more instructions that, when executed by one or more processors of a first network device, cause the one or more processors to receive information indicating a link down event associated with a second network device, where the information indicating the link down event may be received prior to being received by a third network device, where the first network device, the second network device, and the third network device may be associated with a network, and where the second network device may be a designated network device of the network. The one or more instructions may cause the one or more processors to initiate a delay timer based on receiving the information indicating the link down event and before processing the link down event, where the delay timer may include a default value equivalent to a time associated with sending a hello message and receiving a response to the hello message. The one or more instructions may cause the one or more processors to detect an event that includes at least one of receipt, from the third network device, of a link state advertisement message based on the link down event, or an expiration of the delay timer. The one or more instructions may cause the one or more processors to determine the first network device to be a new designated network device for the network based on detecting the event, and provide, to the third network device, information indicating that the first network device is the new designated network device for the network.

BRIEF DESCRIPTION OF THE DRAWINGS

FIGS. 1A-1G are diagrams of an example implementation described herein.

FIGS. 4-6 are flow charts of example processes for reducing traffic loss during network device failure in an OSPF protocol-based local area network.

DETAILED DESCRIPTION

Figure 1A:
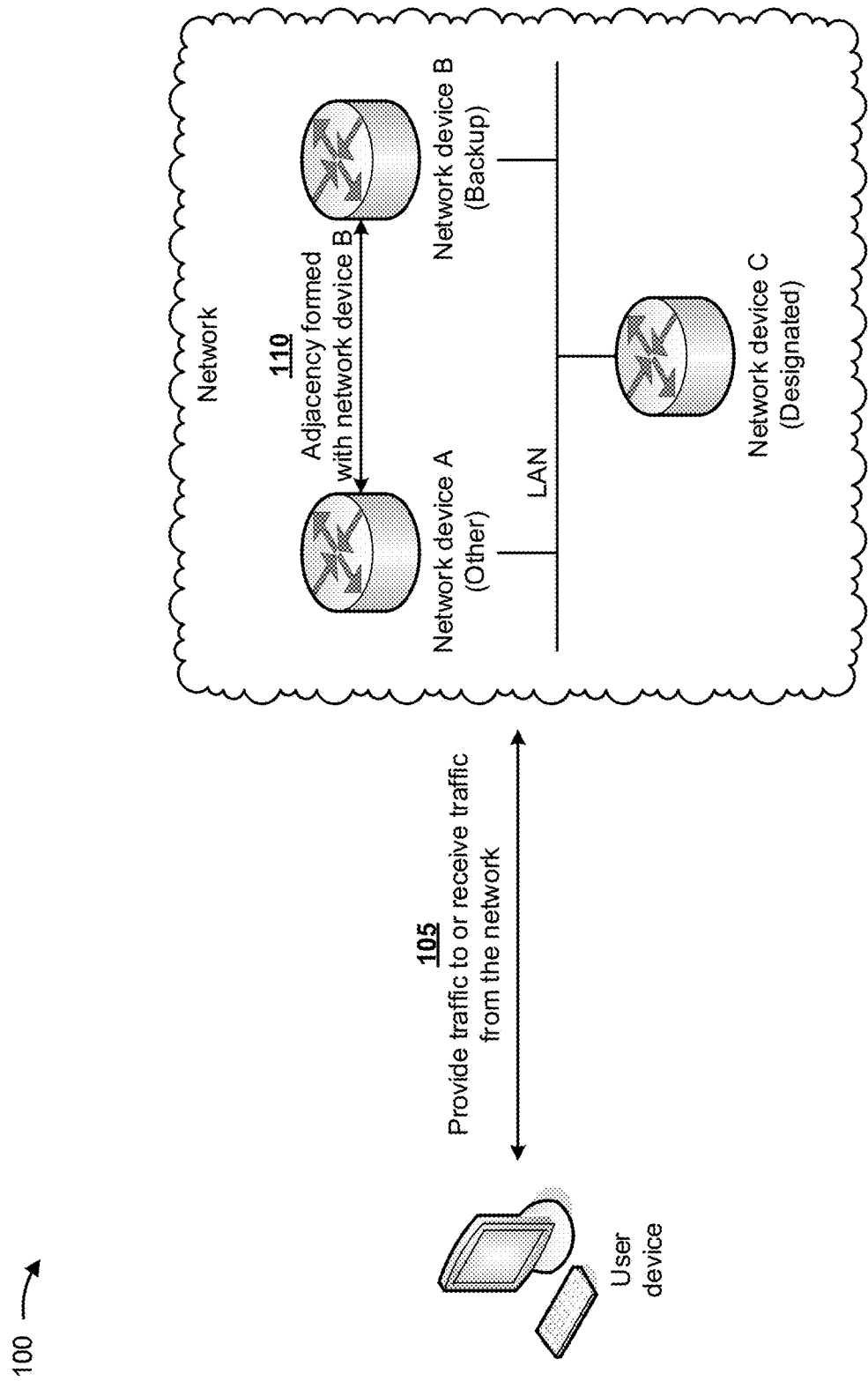

The following detailed description of example implementations refers to the accompanying drawings. The same reference numbers in different drawings may identify the same or similar elements.

When a designated network device experiences a link down event (e.g., due to a link failure or a network device failure), if another network device detects the link down event before the backup designated network device detects the link down event, the other network device will identify the backup designated network device as a new designated network device and will maintain the adjacency with the new designated network device. At a later time, when the backup designated network device detects the link down event, the backup designated network device will be promoted to the new designated network device.

If the backup designated network device detects the link down event before the other network device detects the link down event, the backup designated network device will be promoted to the new designated network device and will send an OSPF hello message (e.g., to the other network devices on the LAN) indicating that the backup designated network device is the new designated network device and that there is no backup designated network device. When the other network device receives the OSPF hello message (e.g., before detecting the link down event), the other network device will execute an OSPF designated network device election procedure and will identify the backup designated network device as a current designated network device. However, since there is no backup designated network device, the other network device will remove adjacency with the backup designated network device. Once the other network device detects the link down event, the other network device will identify the backup designated network device as the new designated network device. However, the other network device will need to reestablish adjacency again with the backup designated network before originating a link-state advertisement (LSA). Reestablishing adjacency is time consuming and leads to network traffic disruption and/or loss.

Some implementations described herein provide a network device that reduces traffic loss during network device failure in an OSPF protocol-based local area network. For example, the network device may be a first network device, and may detect a link down event associated with a second network device. The link down event may be detected prior to being detected by a third network device. The first network device, the second network device, and the third network device may be associated with a network, and the second network device may be a designated network device of the network. The first network device may initiate a delay timer before processing the link down event, and may receive information indicating an expiration of the delay timer. The first network device may determine the first network device to be a new designated network device for the network based on the expiration of the delay timer, and may provide, to the third network device, a message indicating that the first network device is the new designated network device for the network.

In this way, when there is unplanned link down event at a designated network device, a backup designated network device may ensure that adjacencies are maintained between the backup designated network device and other network devices of a network, which greatly reduces network traffic loss. Since the backup designated network device is only required to perform an action (e.g., maintain adjacencies with other network devices), the backup designated network device provides a more manageable or robust solution to the link down event. Furthermore, no protocol changes are required for the backup designated network device to provide the solution to the link down event.

While the following description focuses on an OSPF protocol-based LAN, implementations described herein are equally applicable to other types of protocols, networks, LANs, and/or the like.

FIGS. 1A-1G are diagrams of an example implementation 100 described herein. As shown in FIG. 1A, a user device may be associated with a network. As further shown in FIG. 1A, the network may include multiple network devices, such as network device A, network device B, and network device C. In some implementations, the network may include a broadcast LAN utilizing the OSPF protocol. In some implementations, the OSPF protocol may define network device A as another network device of the LAN (e.g., a network device designated as "other" may include network device that is not a designated network device and not a backup designated network device for the LAN), may define network device B as a backup designated network device for the LAN, and may define network device C as a designated network device for the LAN. In some implementations, the designated network device may optimize flooding in the LAN and may preclude having full mesh connections in the LAN.

As further shown in FIG. 1A, and by reference number 105, the user device may provide traffic to and/or receive traffic from the network. In some implementations, the traffic from the user device may be provided to the designated network device (e.g., network device C), and the designated network device may provide the traffic to another user device (not shown), directly or via one or more other network devices of the network. In some implementations, the other user device may provide to the designated network device (e.g., network device C), and the designated network device may provide the traffic to the user device, directly or via one or more other network devices of the network.

As further shown in FIG. 1A, and by reference number 110, an adjacency may be formed between the backup designated network device (e.g., network device B) and the other network device (e.g., network device A). In some implementations, the adjacency may enable network device A and network device B to share full state information from a LSBD. In some implementations, the designated network device (e.g., network device C) and the backup designated network device (e.g., network device B) may form adjacencies (e.g., share full state information of a LSDB) with all other network devices in the network (e.g., network device A).

Figure 1B:
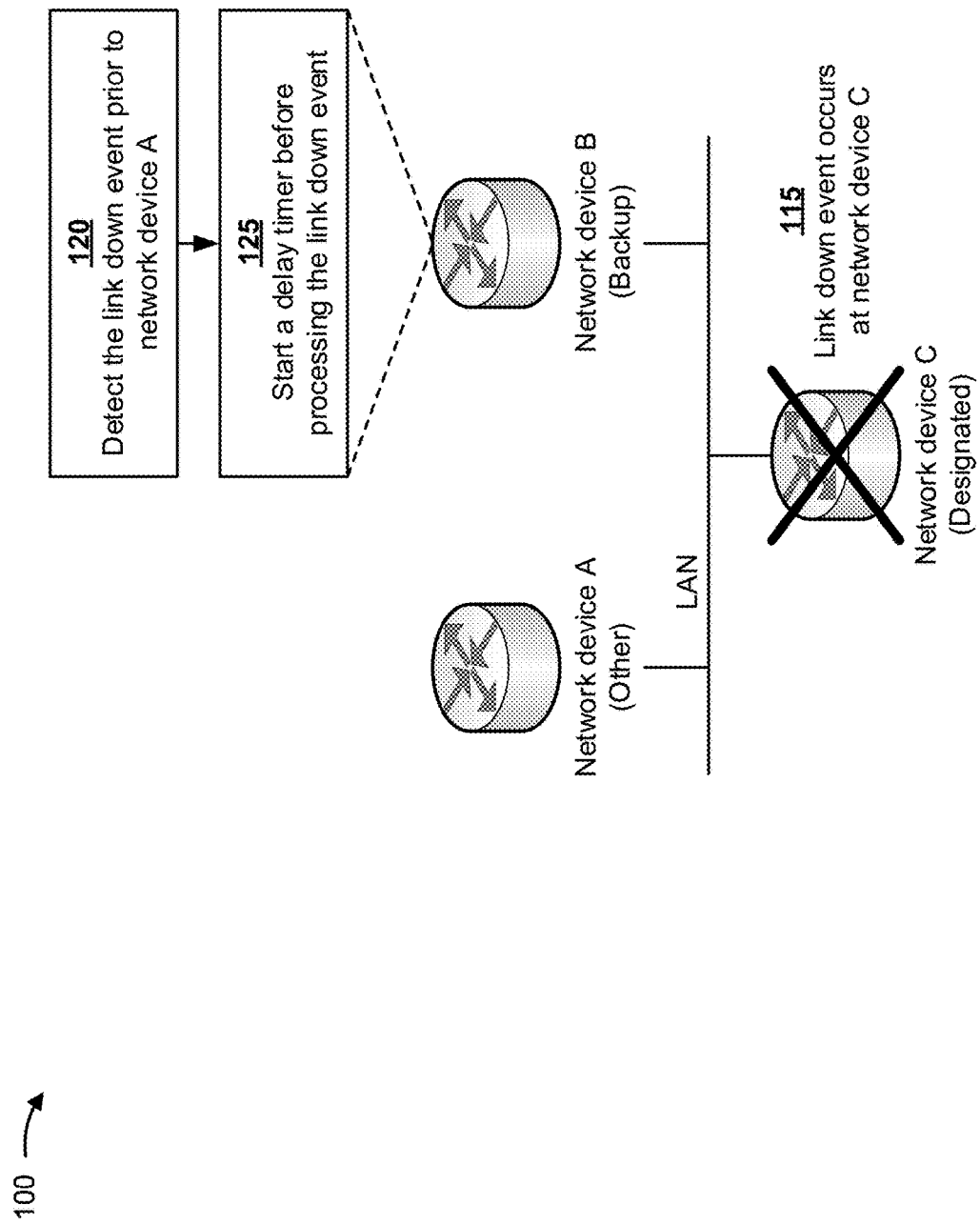

As shown in FIG. 1B, and by reference number 115, a link down event may occur at the designated network device (e.g., network device C). In some implementations, the link down event may occur when the designated network device (e.g., network device C) goes down (e.g., becomes non-operational) or a link connecting the designated network device to the network goes down (e.g., becomes non-operational).

As further shown in FIG. 1B, and by reference number 120, when the link down event occurs, the backup designated network device (e.g., network device B) may detect the link down event prior to network device A detecting the link down event. In some implementations, the backup designated network device may detect the link down event based on providing a message (e.g., an OSPF hello message) to the designated network device and receiving a timeout message in response to the message. In some implementations, the backup designated network device may detect the link down event based on providing the message to the designated network device and not receiving a response message from the designated network device within a predetermined time period. In some implementations, the backup designated network device may detect the link down event based on bidirectional forwarding detection (BFD) between the backup designated network device and the designated network device.

As further shown in FIG. 1B, and by reference number 125, the backup designated network device (e.g., network device B) may initiate or start a delay timer before processing the link down event. In some implementations, the delay timer may be configurable and may include a default value equivalent to a time associated with sending a hello message (e.g., an OSPF hello message) and receiving a response to the hello message (e.g., five seconds, ten seconds, twenty seconds, and/or the like). In some implementations, the backup designated network device may wait for an expiration of the delay timer prior to processing the link down event.

Figure 1C:
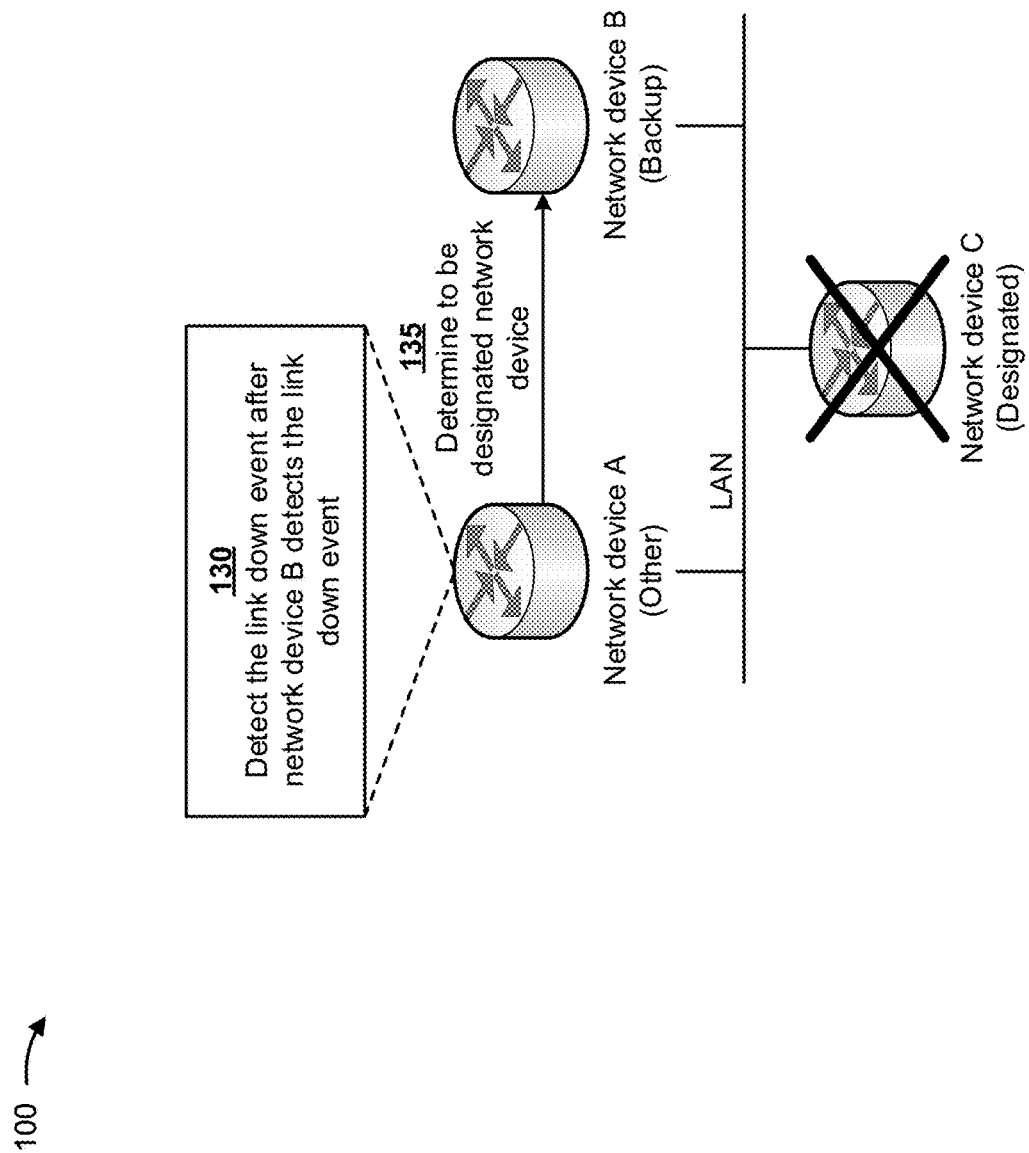

As shown in FIG. 1C, and by reference number 130, the other network device may detect the link down event after the backup designated network device (e.g., network device B) detects the link down event. In some implementations, the other network device may detect the link down event after the backup designated network device due to a time gap between when inactivity (e.g., inactivity of the designated network device) is detected by the other network device and by the backup designated network device. For example, the other network device may detect the link down event after the backup designated network device when the inactivity is detected by the backup designated network device before the other network device.

As further shown in FIG. 1C, and by reference number 135, when the other network device detects the link down event of the designated network device (e.g., network device C), the other network device may determine the backup designated network device (e.g., network device B) to be the designated network device of the network.

Figure 1D:
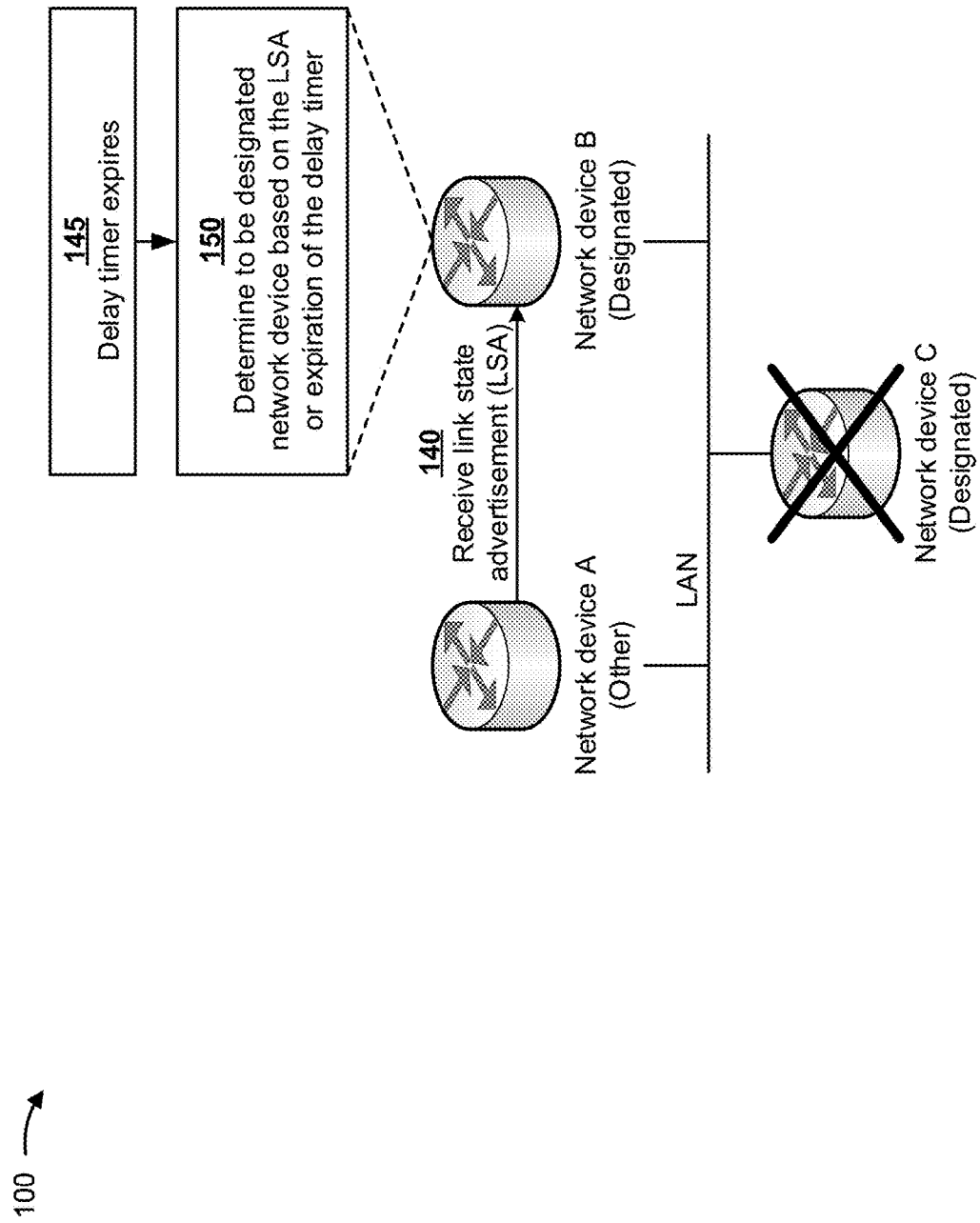

With reference to FIG. 1D, since the other network device has adjacency with the backup designated network device and has determined the backup designated network device to be the designated network device for the network, the other network device may immediately originate a link state advertisement (LSA). As further shown in FIG. 1D, and by reference number 140, the backup designated network device (e.g., network device B) may receive the LSA from the other network device (e.g., network device A).

As further shown in FIG. 1D, and by reference number 145, the backup designated network device may detect an expiration of the delay timer. When the backup designated network device (e.g., network device B) receives the LSA from the other network device or detects the expiration of the delay timer, the backup designated network device may determine itself to be the designated network device for the network (e.g., in place of network device C), as indicated by reference number 150 in FIG. 1D. In some implementations, network device B (e.g., the new designated network device) may receive LSAs from all other network devices of the network that have full link adjacency to network device B (e.g., including network device A).

Figure 1E:
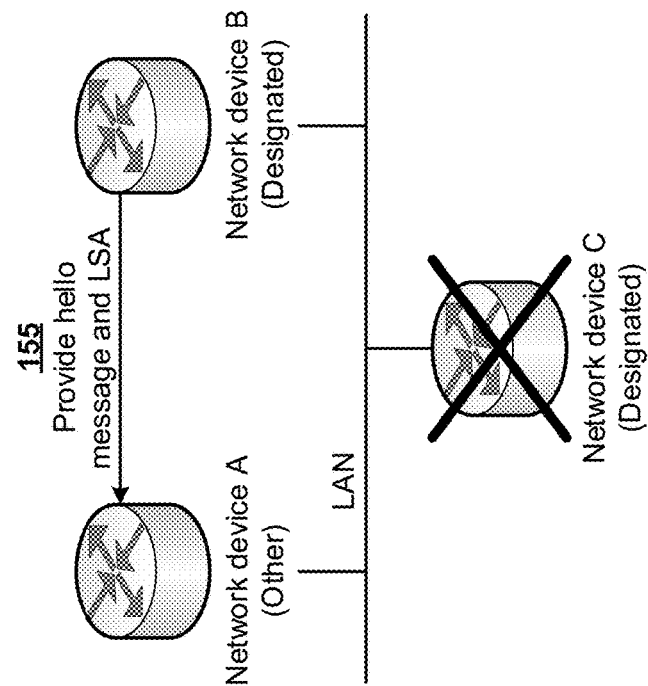

As shown in FIG. 1E, and by reference number 155, network device B (e.g., as the new designated network device) may provide hello messages and LSAs to all other network devices of the network that have full link adjacency to network device B (e.g., including network device A). Network device A may receive the hello message from network device B and need not form adjacency with network device B since adjacency was previously formed between network device A and network device B.

In this way, network device B (e.g., the backup designated network device) may become the new designated network device for the network and may minimize network traffic that is lost due to the link down event at the prior designated network device (e.g., network device C).

Figure 1F:
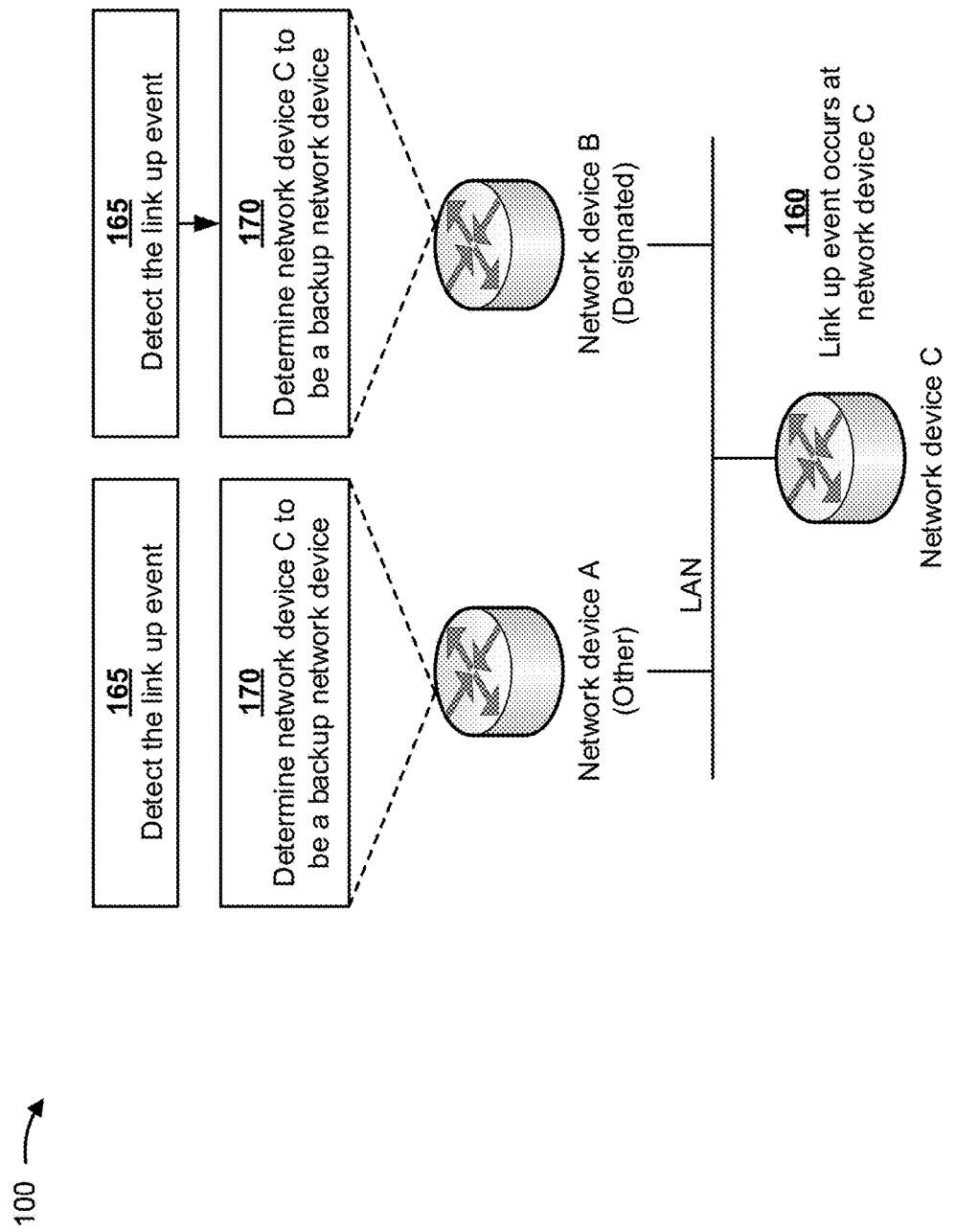

As shown in FIG. 1F, and by reference number 160, a link up event may occur at network device C. In some implementations, the link up event may occur when network device C becomes operational again or a link connecting network device C to the network becomes operational again.

As further shown in FIG. 1F, and by reference number 165, when the link up event occurs, the designated network device (e.g., network device B) and the other network device (e.g., network device A) may detect the link up event. In some implementations, the designated network device and the other network device may detect the link up event based on providing a message (e.g., an OSPF hello message) to network device C and not receiving a timeout message in response to the message. In some implementations, the designated network device and the other network device may detect the link up event based on providing the message to network device C and receiving a response message from network device C within a predetermined time period. In some implementations, the designated network device and the other network device may detect the link up event based on bidirectional forwarding detection (BFD) between the designated network device and network device C. In some implementations, the designated network device and the other network device may detect the link up event based on receiving, from network device C, a message indicating that network device C is back online.

As further shown in FIG. 1F, and by reference number 170, the designated network device (e.g., network device B) and the other network device (e.g., network device A) may determine network device C to be a backup designated network device for the network. In some implementations, the designated network device and the other network device may determine network device C to be another network device, and may determine network device A (e.g., the other network device) to be the backup designated network device for the network.

As shown in FIG. 1G, and by reference number 175, an adjacency may be formed between the designated network device (e.g., network device B) and the backup designated network device (e.g., network device C). In some implementations, the adjacency may enable network device B and network device C to share full state information from a LSBD. The adjacency may be formed while network device B handles the network traffic, and thus, minimizes traffic loss in the network due to the link down event.

As further shown in FIG. 1G, and by reference number 180, an adjacency may be formed between the other network device (e.g., network device A) and the backup designated network device (e.g., network device C). In some implementations, the adjacency may enable network device A and network device C to share full state information from a LSBD.

In this way, several different stages of the process for reducing traffic loss during network device failure in an OSPF protocol-based local area network may be automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to reduce traffic loss during network device failure in an OSPF protocol-based local area network. Finally, automating the process for reducing traffic loss during network device failure in an OSPF protocol-based local area network conserves computing resources (e.g., processor resources, memory resources, and/or the like) and/or network resources that would otherwise be wasted in attempting to prevent traffic loss during a network device failure and/or retrieve traffic lost during a network device failure.

As indicated above, FIGS. 1A-1G are provided merely as examples. Other examples are possible and may differ from what was described with regard to FIGS. 1A-1G.

Figure 2:
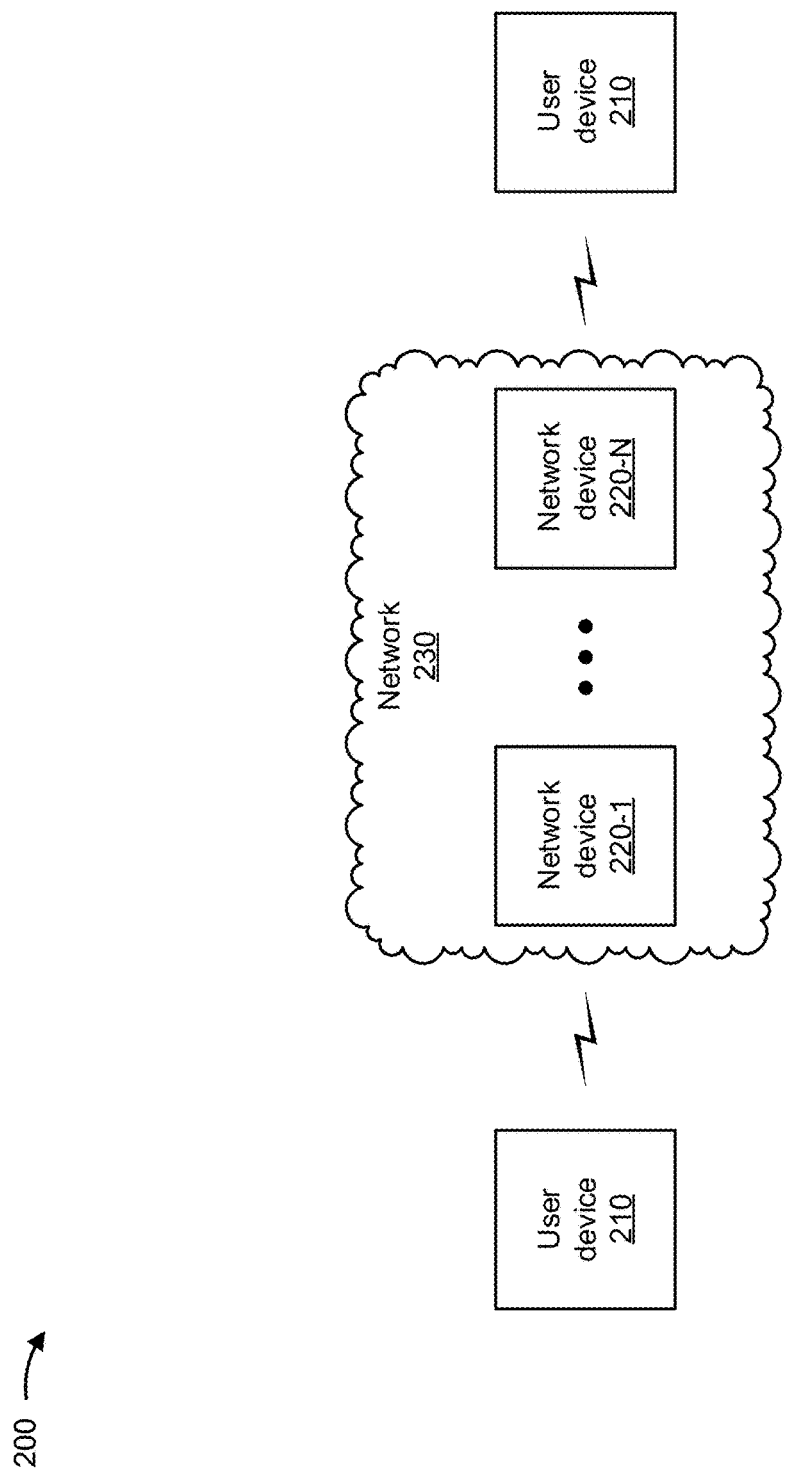
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210, a group of network devices 220 (shown as network device 220-1 through network device 220-N), and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, user device 210 may receive network traffic from and/or may provide network traffic to other user devices 210 via network 230 (e.g., by routing packets using network devices 220 as intermediaries).

Network device 220 includes one or more devices capable of receiving, processing, storing, routing, and/or providing traffic (e.g., a packet, a packet replica, other information or metadata, and/or the like) in a manner described herein. For example, network device 220 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230. In some implementations, network devices 220 may provide a broadcast local area network (LAN) topology based on an open shortest path first (OSPF) protocol.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
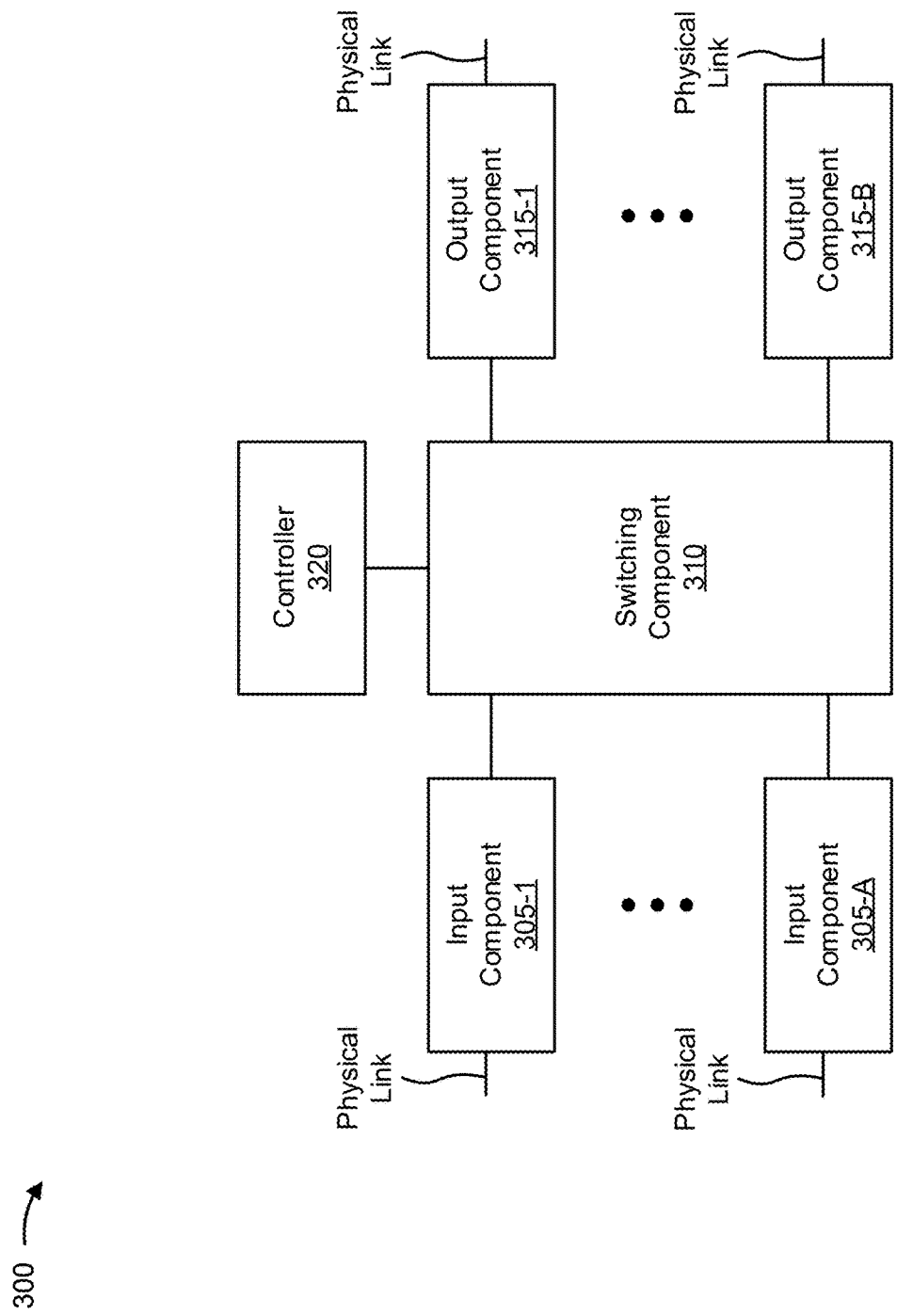
FIG. 3 is a diagram of example components of one or more devices of FIG. 2.

FIG. 3 is a diagram of example components of a device 300. Device 300 may correspond to user device 210 and/or network device 220. In some implementations, user device 210 and/or network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection (e.g., BFD) session, and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
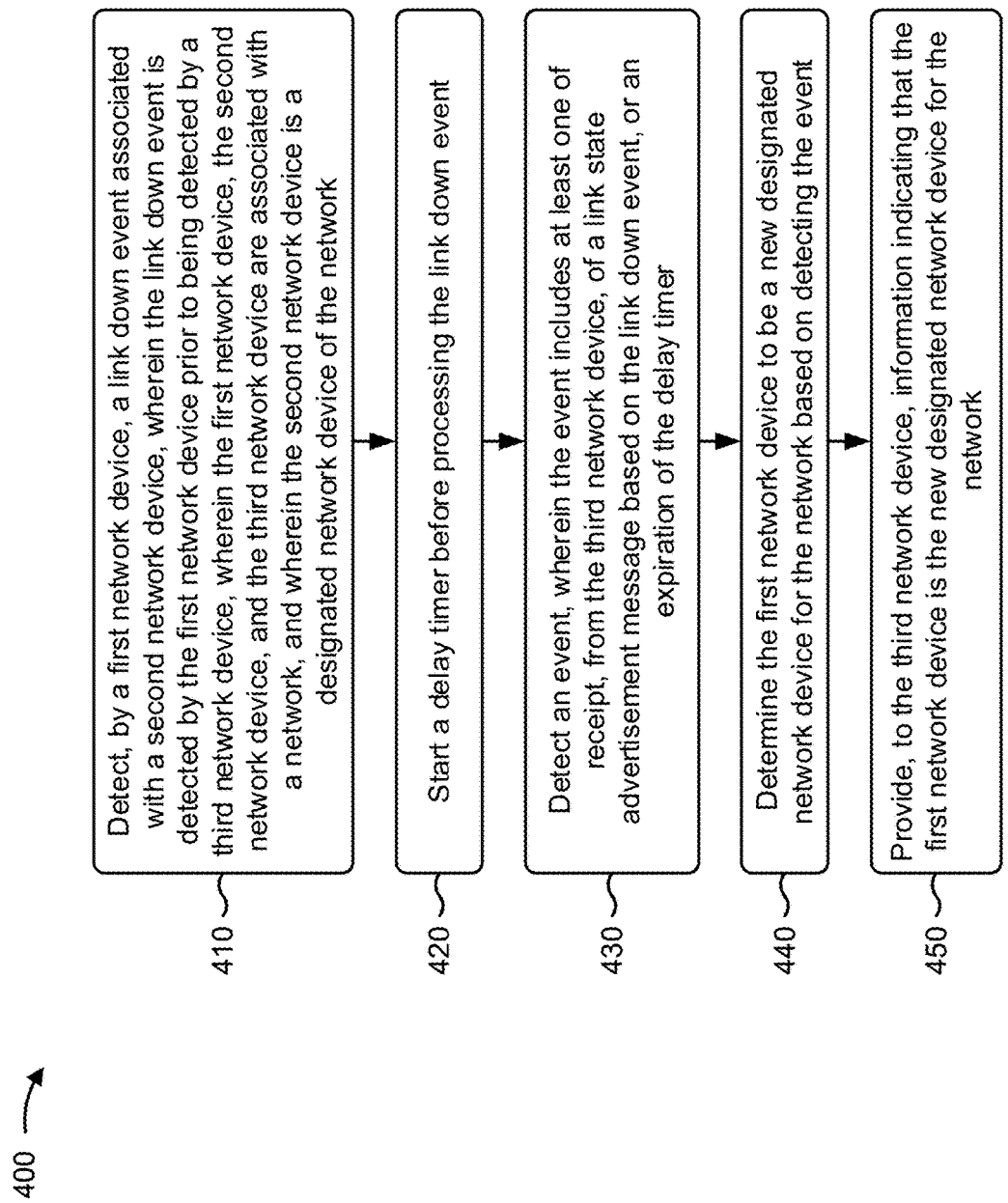

FIG. 4 is a flow chart of an example process 400 for reducing traffic loss during network device failure in an OSPF protocol-based local area network. In some implementations, one or more process blocks of FIG. 4 may be performed by a network device, such as a first network device (e.g., network device 220). In some implementations, one or more process blocks of FIG. 4 may be performed by another device or a group of devices separate from or including the network device, such as a user device (e.g., user device 210).

As shown in FIG. 4, process 400 may include detecting, by a first network device, a link down event associated with a second network device, wherein the link down event is detected by the first network device prior to being detected by a third network device, wherein the first network device, the second network device, and the third network device are associated with a network, and wherein the second network device is a designated network device of the network (block 410). For example, the first network device (e.g., using input component 305, switching component 310, controller 320, and/or the like) may detect a link down event associated with a second network device, as described above in connection with FIGS. 1A-2. In some implementations, the link down event may be detected by the first network device prior to being detected by a third network device. In some implementations, the first network device, the second network device, and the third network device may be associated with a network. In some implementations, the second network device may be a designated network device of the network.

As further shown in FIG. 4, process 400 may include starting a delay timer before processing the link down event (block 420). For example, the first network device (e.g., using switching component 310, controller 320, and/or the like) may start a delay timer before processing the link down event, as described above in connection with FIGS. 1A-2.

As further shown in FIG. 4, process 400 may include detecting an event, wherein the event includes at least one of receipt, from the third network device, of a link state advertisement message based on the link down event, or an expiration of the delay timer (block 430). For example, the first network device (e.g., using input component 305, switching component 310, controller 320, and/or the like) may detect an event, as described above in connection with FIGS. 1A-2. In some implementations, the event may include receipt, from the third network device, of a link state advertisement message based on the link down event, and/or may include an expiration of the delay timer.

As further shown in FIG. 4, process 400 may include determining the first network device to be a new designated network device for the network based on detecting the event (block 440). For example, the first network device (e.g., using switching component 310, controller 320, and/or the like) may determine the first network device to be a new designated network device for the network based on detecting the event, as described above in connection with FIGS. 1A-2.

As further shown in FIG. 4, process 400 may include providing, to the third network device, information indicating that the first network device is the new designated network device for the network (block 450). For example, the first network device (e.g., using switching component 310, output component 315, controller 320, and/or the like) may provide, to the third network device, information indicating that the first network device is the new designated network device for the network, as described above in connection with FIGS. 1A-2.

Process 400 may include additional implementations, such as any single implementation or any combination of implementations described below and/or in connection with one or more other processes described elsewhere herein.

In some implementations, the first network device may establish adjacency with the third network device prior to detecting the link down event. In some implementations, the first network device may detect a link up event associated with the second network device after determining the first network device to be the new designated network device for the network, may determine the second network device to be a backup designated network device for the network based on detecting the link up event, and may establish adjacency with the second network device based on determining the second network device to be the backup designated network device for the network.

In some implementations, the first network device may be a backup designated network device for the network prior to detecting the link down event. In some implementations, the network may include an open shortest path first (OSPF) protocol-based local area network.

In some implementations, when detecting the link down event associated with the second network device, the first network device may detect the link down event based on receiving a timeout message associated with a hello message provided to the second network device, or may detect the link down event based on bidirectional forwarding detection (BFD) between the first network device and the second network device. In some implementations, the delay timer may include a value equivalent to a time associated with sending a hello message and receiving a response to the hello message.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for reducing traffic loss during network device failure in an OSPF protocol-based local area network. In some implementations, one or more process blocks of FIG. 5 may be performed by a network device, such as a first network device (e.g., network device 220). In some implementations, one or more process blocks of FIG. 5 may be performed by another device or a group of devices separate from or including the network device, such as a user device (e.g., user device 210).

As shown in FIG. 5, process 500 may include detecting, by a first network device, a link down event associated with a second network device, wherein the link down event is detected prior to being detected by a third network device, wherein the first network device, the second network device, and the third network device are associated with a network, and wherein the second network device is a designated network device of the network (block 510). For example, the first network device (e.g., using input component 305, switching component 310, controller 320, and/or the like) may detect a link down event associated with a second network device, as described above in connection with FIGS. 1A-2. In some implementations, the link down event may be detected prior to being detected by a third network device. In some implementations, the first network device, the second network device, and the third network device may be associated with a network. In some implementations, the second network device may be a designated network device of the network.

As further shown in FIG. 5, process 500 may include initiating a delay timer before processing the link down event (block 520). For example, the first network device (e.g., using switching component 310, controller 320, and/or the like) may initiate a delay timer before processing the link down event, as described above in connection with FIGS. 1A-2.

As further shown in FIG. 5, process 500 may include receiving information indicating an expiration of the delay timer (block 530). For example, the first network device (e.g., using input component 305, switching component 310, controller 320, and/or the like) may receive information indicating an expiration of the delay timer, as described above in connection with FIGS. 1A-2.

As further shown in FIG. 5, process 500 may include determining the first network device to be a new designated network device for the network based on the expiration of the delay timer (block 540). For example, the first network device (e.g., using switching component 310, controller 320, and/or the like) may determine the first network device to be a new designated network device for the network based on the expiration of the delay timer, as described above in connection with FIGS. 1A-2.

As further shown in FIG. 5, process 500 may include providing, to the third network device, a message indicating that the first network device is the new designated network device for the network (block 550). For example, the first network device (e.g., using switching component 310, output component 315, controller 320, and/or the like) may provide, to the third network device, a message indicating that the first network device is the new designated network device for the network, as described above in connection with FIGS. 1A-2.

Process 500 may include additional implementations, such as any single implementation or any combination of implementations described below and/or in connection with one or more other processes described elsewhere herein.

In some implementations, the delay timer may include a value equivalent to a time associated with sending a hello message and receiving a response to the hello message. In some implementations, the first network device may establish adjacency with the third network device prior to detecting the link down event, where the adjacency enables the first network device and the third network device to share state information. In some implementations, the delay timer may be configurable.

In some implementations, the first network device may detect a link up event associated with the second network device after determining the first network device to be the new designated network device for the network, may determine the second network device to be a backup designated network device for the network based on detecting the link up event, and may establish adjacency with the second network device based on determining the second network device to be the backup designated network device for the network.

In some implementations, the first network device may be a backup designated network device for the network prior to detecting the link down event. In some implementations, when detecting the link down event associated with the second network device, the first network device may detect the link down event based on receiving a timeout message associated with a hello message provided to the second network device, or may detect the link down event based on bidirectional forwarding detection (BFD) between the first network device and the second network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for reducing traffic loss during network device failure in an OSPF protocol-based local area network. In some implementations, one or more process blocks of FIG. 6 may be performed by a network device, such as a first network device (e.g., network device 220). In some implementations, one or more process blocks of FIG. 6 may be performed by another device or a group of devices separate from or including the network device, such as a user device (e.g., user device 210).

As shown in FIG. 6, process 600 may include receiving, by a first network device, information indicating a link down event associated with a second network device, wherein the information indicating the link down event is received prior to being received by a third network device, wherein the first network device, the second network device, and the third network device are associated with a network, and wherein the second network device is a designated network device of the network (block 610). For example, the first network device (e.g., using input component 305, switching component 310, controller 320, and/or the like) may receive information indicating a link down event associated with a second network device, as described above in connection with FIGS. 1A-2. In some implementations, the information indicating the link down event may be received prior to being received by a third network device. In some implementations, the first network device, the second network device, and the third network device may be associated with a network. In some implementations, the second network device may be a designated network device of the network.

As further shown in FIG. 6, process 600 may include initiating a delay timer based on receiving the information indicating the link down event and before processing the link down event, wherein the delay timer includes a default value equivalent to a time associated with sending a hello message and receiving a response to the hello message (block 620). For example, the first network device (e.g., using switching component 310, controller 320, and/or the like) may initiate a delay timer based on receiving the information indicating the link down event and before processing the link down event, as described above in connection with FIGS. 1A-2. In some implementations, the delay timer may include a default value equivalent to a time associated with sending a hello message and receiving a response to the hello message.

As further shown in FIG. 6, process 600 may include detecting an event, wherein the event includes at least one of receipt, from the third network device, of a link state advertisement message based on the link down event, or an expiration of the delay timer (block 630). For example, the first network device (e.g., using input component 305, switching component 310, controller 320, and/or the like) may detect an event, as described above in connection with FIGS. 1A-2. In some implementations, the event may include at least one of receipt, from the third network device, of a link state advertisement message based on the link down event, or an expiration of the delay timer As further shown in FIG. 6, process 600 may include determining the first network device to be a new designated network device for the network based on detecting the event (block 640). For example, the first network device (e.g., using switching component 310, controller 320, and/or the like) may determine the first network device to be a new designated network device for the network based on detecting the event, as described above in connection with FIGS. 1A-2.

As further shown in FIG. 6, process 600 may include providing, to the third network device, information indicating that the first network device is the new designated network device for the network (block 650). For example, the first network device (e.g., using switching component 310, output component 315, controller 320, and/or the like) may provide, to the third network device, information indicating that the first network device is the new designated network device for the network, as described above in connection with FIGS. 1A-2.

Process 600 may include additional implementations, such as any single implementation or any combination of implementations described below and/or in connection with one or more other processes described elsewhere herein.

In some implementations, the first network device may establish adjacency with the third network device prior to detecting the link down event, where the adjacency enables the first network device and the third network device to share state information.

In some implementations, the first network device may detect a link up event associated with the second network device after determining the first network device to be the new designated network device, may determine the second network device to be a backup designated network device for the network based on detecting the link up event, and may establish adjacency with the second network device based on determining the second network device to be the backup designated network device for the network, where the adjacency enables the first network device and the second network device to share state information.

In some implementations, the first network device may be a backup designated network device for the network prior to detecting the link down event. In some implementations, the information indicating the link down event may include one of a timeout message associated with a hello message provided to the second network device, or a message associated bidirectional forwarding detection (BFD) between the first network device and the second network device. In some implementations, the first network device, the second network device, and the third network device may be routers, and the network may be a broadcast local area network that utilizes an open shortest path first (OSPF) protocol.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  detecting, by a first network device, a link down event associated with a second network device,
    wherein the link down event is detected by the first network device prior to being detected by a third network device,
    wherein the first network device, the second network device, and the third network device are associated with a network, and
    wherein the second network device is a designated network device of the network; starting, by the first network device, a delay timer before processing the link down event; detecting, by the first network device, an event,
    wherein the event includes at least one of:
      receipt, from the third network device, of a link state advertisement message based on the link down event, or
      an expiration of the delay timer;
  determining, by the first network device, the first network device to be a new designated network device for the network based on detecting the event;
  providing, by the first network device and to the third network device, information indicating that the first network device is the new designated network device for the network; and
  detecting a link up event associated with the second network device after determining the first network device to be the new designated network device for the network;
  determining the second network device to be a backup designated network device for the network based on detecting the link up event; and
  establishing adjacency with the second network device based on determining the second network device to be the backup designated network device for the network.

2. The method of claim 1, further comprising:
  establishing adjacency with the third network device prior to detecting the link down event.

3. The method of claim 1, wherein the first network device is a backup designated network device for the network prior to detecting the link down event.

4. The method of claim 1, wherein the network includes an open shortest path first (OSPF) protocol-based local area network.

5. The method of claim 1, wherein detecting the link down event associated with the second network device comprises one of:
  detecting the link down event based on receiving a timeout message associated with a hello message provided to the second network device; or
  detecting the link down event based on bidirectional forwarding detection (BFD) between the first network device and the second network device.

6. The method of claim 1, wherein the delay timer includes a value equivalent to a time associated with sending a hello message and receiving a response to the hello message.

7. The method of claim 1, wherein the adjacency enables the first network device and the second network device to share state information.

8. A first network device, comprising:
  one or more memories; and
  one or more processors to:
    detect a link down event associated with a second network device,
      wherein the link down event is detected prior to being detected by a third network device,
      wherein the first network device, the second network device, and the third network device are associated with a network, and
      wherein the second network device is a designated network device of the network;
    initiate a delay timer before processing the link down event;
    receive information indicating an expiration of the delay timer;
    determine the first network device to be a new designated network device for the network based on the expiration of the delay timer;
    provide, to the third network device, a message indicating that the first network device is the new designated network device for the network;
    detect a link up event associated with the second network device after determining the first network device to be the new designated network device for the network;
    determine the second network device to be a backup designated network device for the network based on detecting the link up event; and
    establish adjacency with the second network device based on determining the second network device to be the backup designated network device for the network.

9. The first network device of claim 8, wherein the delay timer includes a value equivalent to a time associated with sending a hello message and receiving a response to the hello message.

10. The first network device of claim 8, wherein the one or more processors are further to:
  establish adjacency with the third network device prior to detecting the link down event,
    wherein the adjacency enables the first network device and the third network device to share state information.

11. The first network device of claim 8, wherein the delay timer is configurable.

12. The first network device of claim 8, wherein the first network device is a backup designated network device for the network prior to detecting the link down event.

13. The first network device of claim 8, wherein the one or more processors, when detecting the link down event associated with the second network device, are to one of:
  detect the link down event based on receiving a timeout message associated with a hello message provided to the second network device; or
  detect the link down event based on bidirectional forwarding detection (BFD) between the first network device and the second network device.

14. The first network device of claim 8, wherein the adjacency enables the first network device and the second network device to share state information.

15. A non-transitory computer-readable medium storing instructions, the instructions comprising:
one or more instructions that, when executed by one or more processors of a first network device, cause the one or more processors to:
receive information indicating a link down event associated with a second network device,
wherein the information indicating the link down event is received prior to being received by a third network device,
wherein the first network device, the second network device, and the third network device are associated with a network, and
wherein the second network device is a designated network device of the network;
initiate a delay timer based on receiving the information indicating the link down event and before processing the link down event,
wherein the delay timer includes a default value equivalent to a time associated with sending a hello message and receiving a response to the hello message;
detect an event, wherein the event includes at least one of:
receipt, from the third network device, of a link state advertisement message based on the link down event, or
an expiration of the delay timer;
determine the first network device to be a new designated network device for the network based on detecting the event;
provide, to the third network device, information indicating that the first network device is the new designated network device for the network;
detect a link up event associated with the second network device after determining the first network device to be the new designated network device;
determine the second network device to be a backup designated network device for the network based on detecting the link up event; and
establish adjacency with the second network device based on determining the second network device to be the backup designated network device for the network.

16. The non-transitory computer-readable medium of claim 15, wherein the instructions further comprise:
one or more instructions that, when executed by the one or more processors, cause the one or more processors to:
establish adjacency with the third network device prior to detecting the link down event,
wherein the adjacency enables the first network device and the third network device to share state information.

17. The non-transitory computer-readable medium of claim 15,
wherein the adjacency enables the first network device and the second network device to share state information.

18. The non-transitory computer-readable medium of claim 15, wherein the first network device is a backup designated network device for the network prior to detecting the link down event.

19. The non-transitory computer-readable medium of claim 15, wherein the information indicating the link down event includes one of:
a timeout message associated with a hello message provided to the second network device, or
a message associated bidirectional forwarding detection (BFD) between the first network device and the second network device.

20. The non-transitory computer-readable medium of claim 15, wherein:
the first network device, the second network device, and the third network device are routers, and
the network is a broadcast local area network that utilizes an open shortest path first (OSPF) protocol.

* * * * *